INVENTORS
ROBERT J. CARL
CHESTER B. PARKINSON, JR.
BY
ATTORNEY
AGENT

United States Patent Office 3,093,771
Patented June 11, 1963

3,093,771
A.C. MODULATOR PROTECTIVE DEVICE
Robert J. Carl, Granada Hills, and Chester B. Parkinson, Jr., Santa Monica, Calif., assignors to the United States of America as represented by the Secretary of the Air Force
Filed Jan. 12, 1960, Ser. No. 2,085
1 Claim. (Cl. 317—14)

The invention relates to a protective device for alternating current circuits in general and particularly for alternating current modulator circuits.

The object of this invention is to provide a device which upon the occurrence of a current overload will rapidly and positively interrupt input power to a high voltage power transformer connected in an alternating current circuit, thereby protecting the components in the transformer's secondary circuit against damage.

In accomplishing this object an A.C. source is applied across a primary winding of the transformer through a circuit breaker means. The secondary circuit of the transformer comprises a load circuit and a resistor which is a part of the protective device and acts as the ground return for the load circuit. A metallic bridge-rectifier is connected across the resistor. The output leads of the bridge-rectifier are connected to the means for disconnecting the A.C. power source from the primary winding of the transformer. Should, due to a malfunction in the transformer's load circuit, the secondary current rise to a value in excess of normal operation the A.C. voltage developed across the resistor in the secondary circuit when rectified by bridge-rectifier becomes sufficient to activate the disconnecting means which acts to rapidly and positively interrupt the input power to primary winding of the transformer, thus protecting the components of the load circuit from damage.

A more detailed description of the invention will be given in connection with the specific embodiments thereof shown in the accompanying drawing in which.

Figure 1:
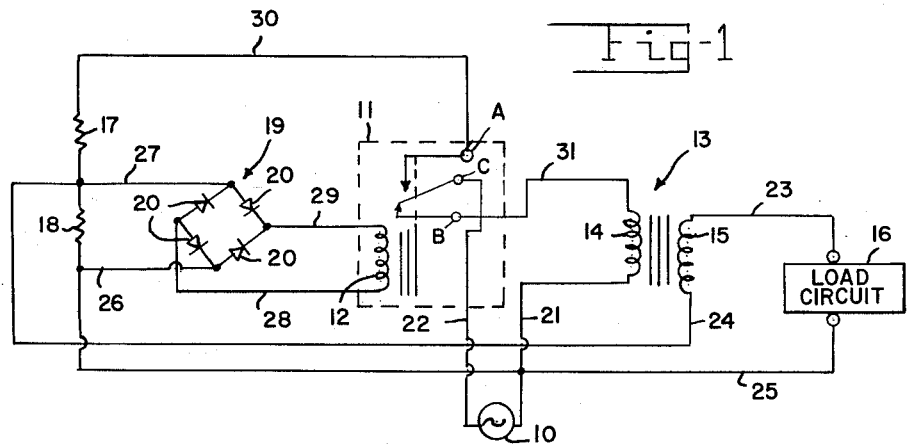
FIGURE 1 is a schematic diagram of the novel protective system.

FIGURE 1 illustrates the simplest form of the protective device. Reference character 10 designates a source of alternating current. Item 13 is a high voltage transformer comprising a primary winding 14 and a secondary winding 15. The alternating current source 10 is connected to the primary winding 14 of the transformer 13 through conductor 21 and a current conducting means consisting of conductor 22, contacts B and C of a direct current relay 11 and conductor 31. The direct current relay 11 comprises a winding 12 and three contacts A, B and C. The winding 12 is capable when energized of moving contact arm C into contact with contact arm A. Contact A is connected through conductor 30 and resistor 17 to the junction of conductors 24, 27 and a lead of resistor 18.

The load for the transformer 13 is load circuit 16 and is connected by means of conductors 23, 24 and 25 across the transformer's secondary winding 15. Load circuit 16 could be, for example, an alternating current resonant charging circuit consisting of a charging choke, a switch tube, a pulse network and a load. The novel protective device may be advantageously used in radar modulators or in power supplies.

The direct current relay 11 is actuatable by the rectification of the alternating current voltage developed across resistor 18 through conductors 26, 27 by a bridge-rectifier 19 preferably composed of four metallic-oxide rectifiers 20. The output from the bridge-rectifier 19 is applied through conductors 28, 29 to the coil 12 of the direct current relay 11.

To eliminate the need for manual resetting, a time delay circuit (not shown) could be provided, whereby the power is removed from the load due to a current overload and is reapplied after a time delay of a predetermined length of time has elapsed.

Figure 2:
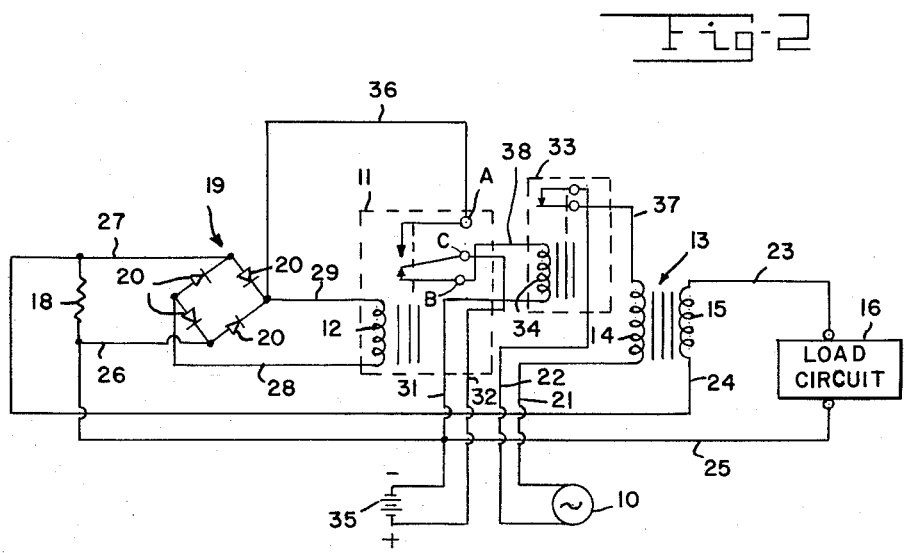
FIGURE 2 shows a modification of the system of FIGURE 1.

A modification of the FIGURE 1 protective device is illustrated by the schematic of FIGURE 2. Like elements are given the same reference numbers in all figures. The structure of the modification differs from that of FIGURE 1 by the addition of a direct current voltage supply 35 and the provision of a second relay 33. The alternating current source 10 is connected to the primary winding 14 of the transformer 13 through conductor 21 and a current conducting means consisting of conductor 22, contacts D and E of relay 33 and conductor 37. The direct current source 35 is connected across the coil 34 of relay 33 through conductor 31 and a current conducting means consisting of conductor 32, contacts B and C of relay 11 and conductor 38. Contact A of relay 11 is connected to the output conductor 29 of the bridge-rectifier 19 through conductor 36. Relay 33 is shown in the energized position.

The operation of the simplest form of protective device can be described with the aid of FIGURE 1. High voltage power transformer 13 receives power through contacts B and C of relay 11 which are normally closed. The load 16 for this transformer may be, for example, an alternating current resonant charging circuit comprising a charging choke, a switch tube, a pulse network and a load. The secondary current of transformer 13 flows through resistor 18 which is the ground return for the load 16. Should the secondary current rise to a value that is in excess of normal operation, which in an alternating current resonant charging modulator is a condition that occurs if the switch tube fails to fire, the A.C. voltage developed across resistor 18 when rectified by bridge-rectifier 19 becomes sufficient to energize the direct current relay 11. Contact C is thus pulled up and contacts arm A. Since contact arm C is connected to one side of the A.C. line, voltage is applied through resistor 17 to resistor 18 which acts as a voltage divider and provides sufficient voltage drop across resistor 18 to insure that relay 11 is pulled completely in and locked regardless of subsequent changes in load current. Contact C terminates contact with B, which opens the circuit to transformer 13. The power is thus removed from transformer 13 and the components of the load circuit are protected against damage. Relay 11 remains energized until the A.C. input power is interrupted. A reset switch may be added to momentarily interrupt the power, or the main power switch may be turned off then back on.

The advantage of employing contact A to lock in the relay 11 is that added power is provided to insure that relay 11 is activated rapidly and positively in case of an increase in the voltage drop across the resistor 18 due to an overload. Relay 11 is a direct current relay to insure positive pull-in without chatter.

The operation of the FIGURE 2 modification is similar to FIGURE 1 except that relay 33 applies the A.C. voltage to transformer 13 instead of employing contacts on relay 11 directly. When sufficient voltage is developed across resistor 18 to operate relay 11, contact A makes contact with contact arm C and C breaks with contact B. When contact A makes contact with arm C, the D.C. lock-in voltage is applied directly to the coil of relay 11. When contacts B, C of relay 11 open relay 33 opens and removes the power from transformer 13.

The invention is not limited to the examples of embodiments shown and described, but may, on the contrary, be capable of many modifications.

We claim:

A protective device for an alternating current circuit comprising an A.C. source, a power transformer having a primary winding connected across said A.C. source and a secondary winding, a load in circuit with said secondary winding, a bridge-rectifier having input and output terminals, means for developing an A.C. voltage proportional to the current through said load, means for applying said voltage to the said input terminals of said bridge-rectifier, a relay having a coil and a first, second and third contacts, said second and third contacts normally being closed and adapted to be opened when the said coil is energized, said first contact being normally open and adapted to be closed to said third contact when said coil is energized, means for connecting said A.C. source to the said primary winding through said normally closed second and third contacts, means for connecting said A.C. source across said input of the rectifier through said normally open first and third contacts, and means for connecting said bridge-rectifier to said coil whereby on the occurrence of sufficient voltage at said output terminals the said coil is energized and the said A.C. source is removed from the said primary winding.

References Cited in the file of this patent

UNITED STATES PATENTS

| | | |
|---|---|---|
| 1,833,078 | Hoffmann | Nov. 24, 1931 |
| 1,884,444 | West | Oct. 25, 1932 |
| 2,036,270 | Griscom | Apr. 7, 1936 |
| 2,305,096 | McDermott | Dec. 15, 1942 |
| 2,542,367 | Seaman | Feb. 20, 1951 |

FOREIGN PATENTS

| | | |
|---|---|---|
| 38,808 | France | Apr. 27, 1931 |